United States Patent [19]

Wahlquist et al.

[11] Patent Number: 4,623,825
[45] Date of Patent: Nov. 18, 1986

[54] DELAY COMPENSATION IN ELECTROMAGNETIC DEFLECTION SYSTEMS

[75] Inventors: Clayton C. Wahlquist, West Valley City, Utah; H. Wayne Olmstead, Hillsboro, Oreg.

[73] Assignee: Tektronix, Inc., Beaverton, Oreg.

[21] Appl. No.: 365,658

[22] Filed: Apr. 5, 1982

[30] Foreign Application Priority Data

Apr. 3, 1981 [JP] Japan ................................ 56-49522

[51] Int. Cl.$^4$ ...................... H01J 29/70; H01J 29/56
[52] U.S. Cl. ................................. 315/368; 315/370
[58] Field of Search ............. 315/371, 393, 403, 382, 315/368, 370, 395; 358/34

[56] References Cited

U.S. PATENT DOCUMENTS

| | | | |
|---|---|---|---|
| 3,501,669 | 3/1970 | Henderson | 315/370 |
| 3,772,566 | 11/1973 | Schwartz | 315/27 GD |
| 4,162,434 | 7/1979 | Dietz | 315/411 |
| 4,427,926 | 1/1984 | Strathman | 315/368 |
| 4,441,057 | 4/1984 | Wrona | 315/368 |

OTHER PUBLICATIONS

C. J. Boers, "Improved Circuits for 110° Colour TV Picture Tube A65-140X" Philips Application Information 12/69, pp. 15-24.

Primary Examiner—Theodore M. Blum
Assistant Examiner—Gregory C. Issing
Attorney, Agent, or Firm—John D. Winkelman; James Campbell

[57] ABSTRACT

An electromagnetic deflection circuit is disclosed. The deflection circuit includes a plurality of loss elements. These loss elements are responsible for the production of an inherent time delay between the energization of the circuit by an input signal and the generation of a magnetic flux used to deflect an electron beam within a cathode-ray tube. According to an exemplified embodiment of the invention, a DC level shift signal generator, a beam position input signal generator, and an adder for adding the DC level shift signal to the beam position input signal produce an input signal that energizes the correction deflection circuit. The introduction of the DC level to the beam position input signal effectively advances, in time, the output signal from the convergence correction signal generator. This advance compensates for the various time delays present in the deflection circuit.

14 Claims, 6 Drawing Figures

DELAY COMPENSATION IN ELECTROMAGNETIC DEFLECTION SYSTEMS

BACKGROUND OF THE INVENTION

The present invention relates generaly to CRT electron beam defletion systems, and more particularly to the compensation of delays inherent in electromagnetic deflection systems.

Television and other CRT-type image display systems typically use a large magnetic yoke to scan the CRT's electron beam(s) over the surface of its phosphor display screen in a raster pattern. Most multicolor cathode-ray tubes have three closely-spaced beams, which must be substantially coincident, or converged, at the screen and remain so as they are deflected over its surface. Thus, in addition to deflection by the common magnetic yoke to produce a scanned raster, each beam is also deflected individually as needed to maintain convergence over the entire screen. This small angle, variable beam deflection, referred to as dynamic convergence, is accomplished by applying correction signals to convergence coils on the neck of the CRT.

There is an inherent delay (not a pure delay, but instead a complex error function the major part of which is a time shift) between the input current waveform driving a deflection coil and the flux it produces. In a television-type display, the corrections required for beam convergence and for pincushion distortion and tilt of the vertical raster can be significantly affected by such delays. Most such displays operate at fixed, relatively low scan rates—approx. 15 KHz for U.S. commercial television—at which delays can be tolerated, or compensated using standard controls. However, electromagnetically-deflected CRT displays operating at higher horizontal scan rates encounter a much more severe problem, particularly those designed to operate over a wide range of frequencies. For example, a delay of six percent of the horizontal width at 60 μs active time (approx. 15 KHz) would increase to 25% of the horizontal width at 14 μs active time (approx. 50 KHz). Video type display devices operating over a wide range of horizontal scan rates tus require some means of compensating for the effects of deflection system delays on beam position-related correction signals, such as those for beam convergence or top and bottom raster tilt.

SUMMARY OF THE INVENTION

The present invention solves the above-identified problem by advancing the correction signals an amount sufficient to cancel out the deflection system delay(s). The required advance may be provided, for example, through the use of a phase lock loop, but a preferable approach is to add a d.c. level shift to a beam position-related signal from which the correction signal is derived.

According to a preferred embodiment of the invention, which is described in greater detail below, a correction waveform generator for an electromagnetically-deflected video display is compensated for deflection system delays by adding an appropriate d.c. level shift to a ramp signal from which the correction waveforms are derived. This d.c. offset causes the correction signals to be time advanced an amount sufficient to compensate for delays in the deflection system and its drive circuitry. This delay compensation method—i.e., adding a d.c. level shift to a beam position-related ramp signal from which the correction signal is derived— may be used for both the beam convergence and the vertical raster top and bottom tilt correction signals.

Further applications of the present invention will become apparent as the following detailed description is read in conjunction with the accompanying drawings.

DETAILED DESCRIPTION

Figure 1:
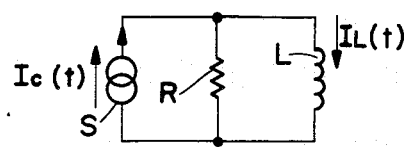
FIG. 1 is a simplified circuit diagram used in explaining the principle of the present invention.

Referring now to the drawings, FIG. 1 illustrates a simplified model of an electromagnetic deflection circuit that includes a CRT deflection coil L, a loss element R representing the effective parallel resistance associated with the coil, and a suitable current source S. It can be shown that for an input current $I_c(t)$, where $$I_c(t) = K_0 + K_1 t + K_2 t^2 + K_3 t^3 + K_4 t^4$$

the current $I_L(t)$ in inductor L is
$$I_L(t) = I_c(t - L/R) + K_e e^{-R/Lt} + K'_2 + K'_3 t + K'_4 t^2$$

The gain coefficients $K'_2$, $K'_3$, $K'_4$, etc. are small with respect to the coefficients of the corresponding powers of t in $I_c$ ($t - L/R$) when $L/R << t_A/2$, $t_A$ being the active time of the CRT's horizontal sweep.

Figure 2:
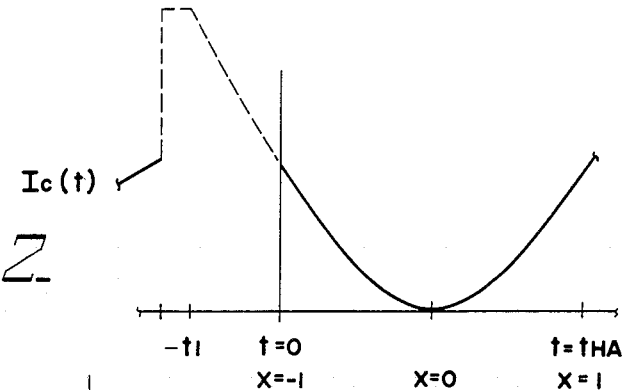
FIG. 2 is a time plot of input current $I_c(t)$ in the FIG. 1 circuit.

FIG. 2 illustrates graphically the current $I_c(t)$ generated by source S. By beginning generation of the desired correction waveform (here a parabola) by suitable time $-t_1$ prior to the start of the electron beam's active sweep period, which begins at time $t=0$ at the left side of the display screen ($X = -1$), the transient resulting from the expoential term $K_e e^{-R/Lt}$ will be substantially decayed. The field-producing current through the coil thus may be approximated by $I_L(t) \cong I_c$ ($t - L/R$). Accordingly, the delay produced by loss element R can be compensated by a time advance term $+L/R$.

Figure 3:
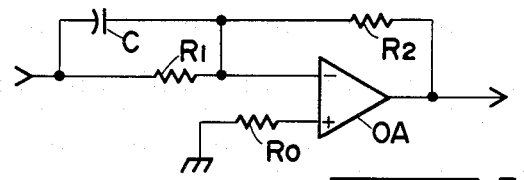
FIG. 3 shows a simplified coil driver circuit.

The coil driver circuit shown (in simplified form) in FIG. 3 can be adjusted to cancel the delay produced by the deflection coil's loss element R. The circuit includes an operational amplifier OA whose noninverting input is referenced to ground by a resistor $R_0$. An input resistor $R_1$ connected to the amplifier's inverting ($-$) input is bridged by a capacitor C, and the output of the amplifier is coupled to its inverting input by a feedback resistor $R_2$. If the value of capacitor C is equal to $L/R_1 \cdot R$, the delay caused by loss element R will be cancelled out. The FIG. 3 circuit, which acts as a differentiator, has certain drawbacks, however. It is less stable than desired, and does not compensate for other delays in the deflection system.

Figure 4:
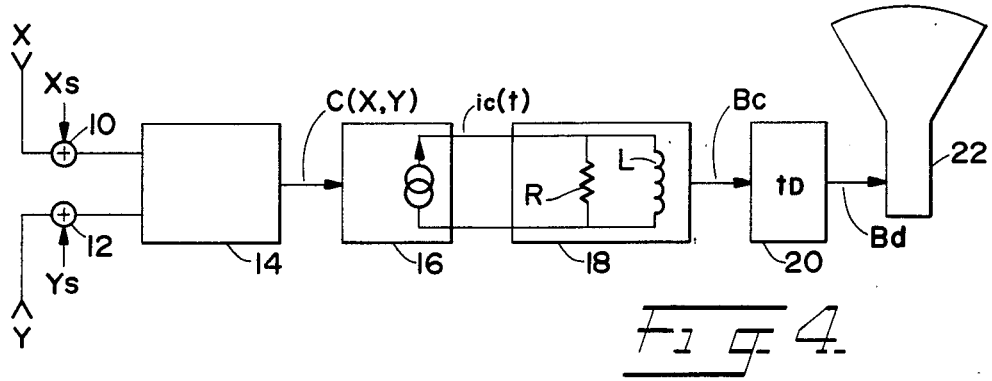
FIG. 4 is a block diagram of a beam deflection correction system incorporating the present invention.

A block diagram of a CRT beam deflection system illustrating the preferred practice of the invention is shown in FIG. 4. Such a system may be used, for example, to achieve dynamic convergence correction of the beams in a delta-gun color CRT. The FIG. 4 deflection system uses beam position information to generate suitable correction waveforms, which are applied to a deflection coil mounted on the CRT. The correction function may be expressed as C(X,Y), where C(0,0) is the center of the display screen. The terms X and Y represent positions on the horizontal and vertical axes, respectively, of the CRT screen each term varying in value between −1 and +1.

The FIG. 4 system includes a pair of adders 10 and 12 for summing beam-shifting signals Xs and Ys with horizontal and vertical beam position signals X and Y, respectively. The summed beam position and time shift signals are applied to the appropriate inputs of a correction waveform generator 14, which produces a desired correction signal C(X,Y) at its output. Generator 14 may, for example, be a convergence waveform generator of known design, such as the one shown in U.S. Pat. No. 3,942,067 to Cawood.

The output signal C(X,Y) from correction generator 14 is supplied to a coil driver circuit 16, which provides an output current signal $I_c(t)$ to drive a beam deflector 18. Deflector 18 includes a deflection coil L and its associated effective parallel resistance R. Driver circuit 16 is conventional and may, for example, take the form of a class B linear transconductance amplifier. The current through coil L produces a magnetic field $B_c$ that is coupled into CRT 22 to provide a deflecting field $B_d$ in the path of a beam within the tube. Color CRT's typically include internal pole pieces near each electron gun for applying convergence correction fields to the beams. The delay $t_D$ produced by the internal coupling structure is represented in FIG. 4 by a delay block 20.

The beam position-related signals X and Y are related to time by the expressions $$X = \frac{2t}{t_{HA}} - 1 \quad Y = \frac{2t}{t_{VA}} - 1$$

where $t_{HA}$ is the horizontal active time (the time required for the beam to travel across the screen from X=−1 to X=+1) and $t_{VA}$ is the vertical active time. The beam shifting signals Xs and Ys are related to time by the expressions $$X_s = \frac{2t_s}{t_{HA}} \quad Y_s = \frac{2t_s}{t_{VA}}$$

where ts is the time advance required for compensate for system delays.

As will be understood from FIG. 4, $$C(X) \rightarrow I_c(t)$$

and $$B_D(t) = B_c(T - T_D) = K_B I_L(t - t_D) = K_B I_c(t - t_D - L/R)$$

When a beam shift Xs is included, $$C(X + X_s) \rightarrow I_c(t + t_s)$$

and $$B_D(t) = K_B I_c(t - t_D - L/R + t_s)$$

When ts is equal to $(t_D + L/R)$, $$B_D(t) = K_B I_c(t)$$

Therefore, $$X_s = \left(\frac{L}{R} + t_D\right) \frac{2}{t_{HA}}$$

is the horizontal shift required to cancel the time delays inherent in the FIG. 4 deflection system. A similar derivation may be made for Ys; however, in most systems the vertical position shift may be omitted since $Y_s = (L/R)(2t_{VA}) < < < 1$.

Figure 5:
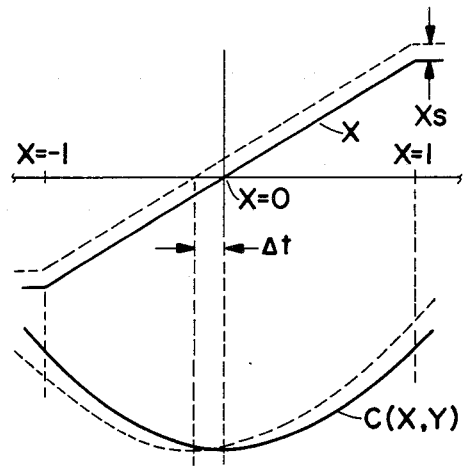
FIG. 5 depicts certain waveforms illustrating the delay compensation provided by the FIG. 4 system.

As will by now be evident, the correction signal C(X,Y) may be advanced in time to cancel out deflection system delays by suitably shifting the beam position-related signal(s) from which the correction waveform is derived. This is accomplished, according to the invention, by applying a d.c. offset to horizontal (or vertical) ramp signals used to generate the correction signals. Referring to FIG. 5, it will be seen that the addition of a d.c. offset Xs to a horizontal ramp signal X effectively advances the ramp (i.e., shifts it toward the left side of the screen) an amount ΔX corresponding to a time shift Δt. The effect on a resultant parabolic correction signal C(X,Y) from generator 14 (FIG. 4) is shown in the lower portion of FIG. 5. Thus, by applying an appropriate offset to the input ramp, delays inherent in the deflection coil and its associated magnetic structure, as well as those associated with the coil drive circuitry, may be readily compensated. The amount of offset, or time shift, required will be different at different scan rates, and may be varied either mannually or automatically. Moreover, an offset ramp signal used to correct for delays in one deflection system may be used to correct for delays in a different system associated with the same CRT.

Figure 6:
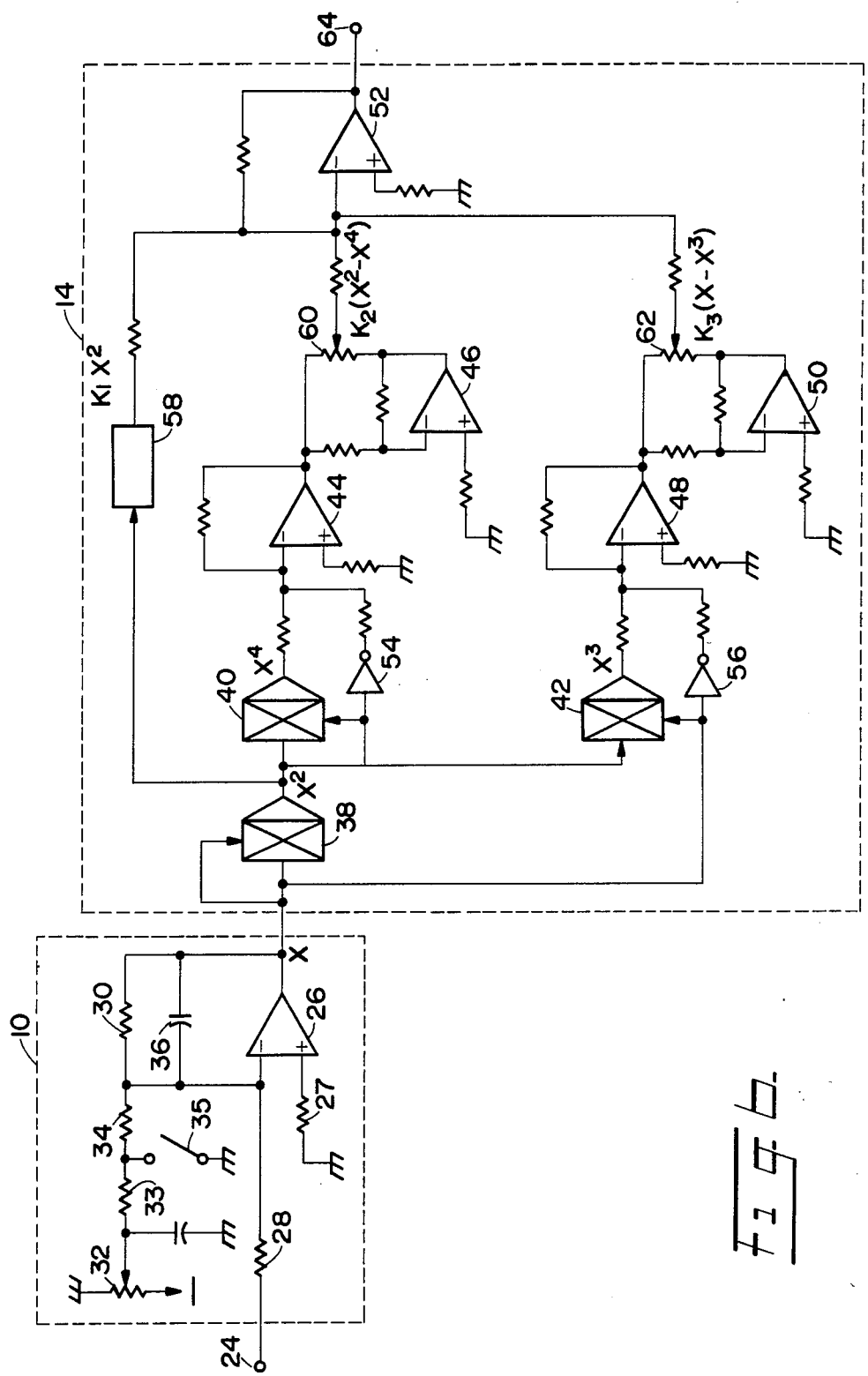
FIG. 6 is a schematic diagram of certain circuitry for adapting the FIG. 4 system to correction of beam convergence.

FIG. 6 illustrates suitable circuitry for the adder 10 and correction generator 14 of FIG. 4 as used in a convergence correction system for a color CRT display. Adder 10 includes an operational amplifier 26 receiving at its inverting input a horizontal beam position signal (X) via input terminal 24 and input resistor 28. The non-inverting input of amplifier 26 is referenced to ground potential by resistor 27. A feedback resistor 30 paralleled by a capacitor 36 is connected between the output and inverting input of the amplifier. A d.c. position shift signal (Xs) generated by a potentiometer 32 is applied to the inverting input of amplifier 26 via series resistors 33, 34, whose common junction may be connected to ground via a switch 35.

It will be understood that the output signal from operational amplifier 26 is of the form (X+Xs). For convenience, however, the combined signal is indicated simply by X in FIG. 6. The position control signal (Xs) is controllable by potentiometer 32 to any value required to cancel out delays in the system, or may be disabled by closing switch 35.

Correction generator 14 includes three multipliers 38, 40, and 42, five differential operational amplifiers 44, 46, 48, 50 and 52, two inverters 54, 56, a variable gain amplifier (or attenuator) 58, two potentiometers 60 and 62, and associated passive elements, which are configured to provide a parabola signal $K_1X^2$, and two higher degree correction signals $K_2(X^2 - X^4)$ and $K_3(X - X^3)$. These are, in trun, supplied to the input of summing amplifier 52 to provide the required convergence correction signal from output terminal 64.

The functions $(X^2-X^4)$ and $(X-X^3)$ are used to provide more precise correction without causing interaction with the parabola signal $K_1X^2$ at the right and left sides of the screen.

It will be apparent to those skilled in the art that many changes and modifications may be made in the specific circuits and examples given herein. Such variations are not to be regarded as a departure from the scope of the invention, which is limited only as required by the terms of the appended claims and the supporting disclosure.

We claim as our invention:

1. An electron beam deflection circuit for a cathode ray tube, comprising:
   deflection coil means for deflecting the electron beam in said tube;
   deflection signal generator means for applying a deflection signal to said coil means;
   input means for supplying a beam position-related input signal;
   correction signal generator means for producing an output correction signal in response to said beam position-related input signal and for applying said output correction signal to said deflection signal generator means to produce a corrected deflection signal; and
   compensation means for adding a D.C. level shift signal to the beam position-related input signal to provide a compensated beam position input signal which is applied to the input of said correction signal generator.

2. The circuit of claim 1, wherein said beam position-related signal is a ramp signal, and said further signal is a d.c. potential.

3. An electromagnetic deflection circuit for deflecting an electron beam being generated in the neck of a cathode ray tube, said deflection circuit having inherent time delays inclusive therein due to a plurality of loss elements in said deflection circuit, comprising:
   means for developing an input signal, said input signal energizing said electromagnetic deflection circuit, the means for developing an input signal including,
   means for generating a beam position input signal,
   means for generating a shift signal representative of a DC level increment,
   adder means responsive to said beam position input signal and to said shift signal for adding said shift signal to said beam position input signal to provide a compensated position signal, and correction signal generator means for producing said input signal in response to the application of said compensated position signal to the input of the correction signal generator means; and
   means responsive to said input signal for developing a magnetic field, said magnetic field deflecting said electron beam being generated in the neck of said cathode ray tube;
   whereby the introduction of said DC level increment into said beam position input signal compensates for the inherent time delays produced by the plurality of loss elements in said deflection circuit.

4. An electromagnetic deflection circuit in accordance with claim 3 wherein three electron beams are generated in the neck of said CRT tube; and wherein the means for developing a magnetic field comprises:
   correction signal generating means responsive to said input signal for generating a correction signal representative of the amount of correction needed to converge said three electron beams, said correction signal being advanced along the time axis in response to said shift signal representative of said DC level increment.

5. An electromagnetic deflection circuit in accordance with claim 4 wherein the means for developing further comprises:
   means responsive to said correction signal for amplifying said signal; and
   deflection means responsive to the amplified correction signal for generating a magnetic field, said magnetic field deflecting at least one of the electron beams being generated in the neck of said cathode ray tube.

6. An electromagnetic deflection circuit in accordance with claim 5 wherein the means for amplifying comprises an operational amplifier havng one input terminal being connected to a ground potential and another input terminal responsive to said correction signal, said another input terminal being connected to a resistor-capacitor parallel combination, the output terminal of said operational amplifier and said another input terminal being connected together via a feedback resistor.

7. an electron beam deflection circuit comprising:
   a deflection coil means and a deflection signal generator coupled to the coil means, correction signal generator means for producing an output correcton signal derived from a beam position-related input signal corresponding to the output of said deflection signal generator, and compensation means connected to the input of the correction signal generator means, for adding a D.C. level shift signal to said beam position-related input signal before it is applied to the correction signal generator means to cause a time advance of the output correction signal sufficient to substantially cancel time delays inherent in the deflection circuit without changing the waveform of said output signal.

8. The circuit of claim 7, wherein the deflection coil means is for a cathode ray tube, said beam position-related input signal is a ramp shaped raster scan signal, and said compensation means combines said input signal with a compensation signal of d.c. voltage to provide said time advance.

9. An electromagnetic deflection circuit for deflecting an electron beam, said deflection circuit having inherent time delays inclusive therein due to a plurality of reactive impedance elements in said deflection circuit which tend to cause distortion at different deflection frequencies, comprising:
   correction signal generator means for generating a corrected output deflection signal,
   input means for supplying a beam position-related input signal,
   shift means for generating a shift signal representative of a d.c. level increment,
   adder means for adding said shift signal to said beam position-related input signal thereby introducing said d.c. level increment into sid beam position input signal to provide a compensated input signal, applying said compensated input signal to the input of said correction signal generator means and producing said corrected output signal in response thereto; and deflection means responsive to said corrected output signal for developing a magnetic field, said magnetic field deflecting said electron beam;

said shaft signal causing the introduction of said d.c. level increment into said beam position input signal to compensate for inherent time delays produced by the plurality of loss elements in said deflection circuit.

10. An electromagnetic deflection circuit in accordance with claim 9 wherein the deflection means is for a cathode ray tube and three electron means are deflected in the cathode ray tube; and wherein the correction means comprises:

convergence correction signal generating means responsive to said input signal for generating a convergence correction signal representative of the amount of correction needed to converge said three electron beams, said correction signal being advanced along the time axis in response to said shift signal representative of said d.c. level increment.

11. An electromagnetic deflection circuit in accordance with claim 7 which also comprises:

driver means for amplifying said correction signal; and said deflection means is responsive to the amplified correction signal for generating a magnetic field, said magnetic field deflecting at least one of the electron beams in said cathode ray tube.

12. An electromagnetic deflection circuit in accordance with claim 11 wherein the driver means for amplifying comprises an operational amplifier, one input terminal being connected to a ground potential, another input terminal connected to the output of said correction signal generating means to be responsive to said correction signal, said another input terminal being connected to a resistor-capacitor parallel combination, the output terminal of said operational amplifier and said another input terminal being connected together via a feedback resistor.

13. The circuit of claim 8 wherein the compensation means adjusts the value of said d.c. voltage to compensate for changes in the slope and scan rate of said scan signal.

14. The circuit of claim 9 wherein the beam position input signal is a raster scan signal and said shift means adjusts the value of said d.c. level to change the magnitude of said shift signal to compensate for changes in the slope and scan rate of said scan signal.

* * * * *